May 6, 1952     R. M. JAMES     2,596,028
FLEXIBLE INSERT FOR FORMING RECESSES
IN WALLS AND THE LIKE
Filed March 29, 1949     2 SHEETS—SHEET 1
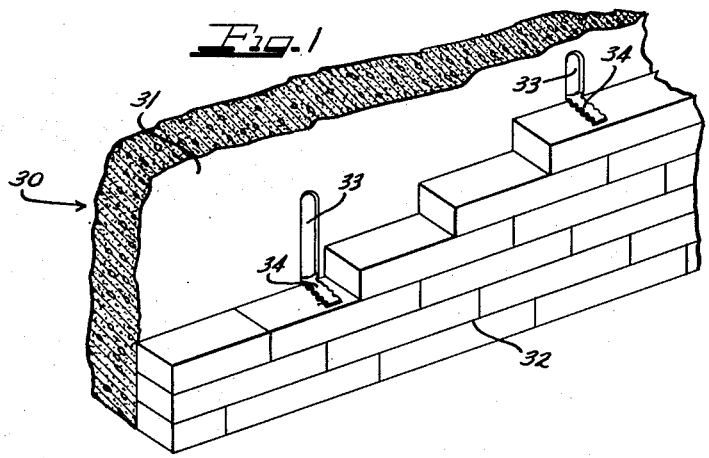
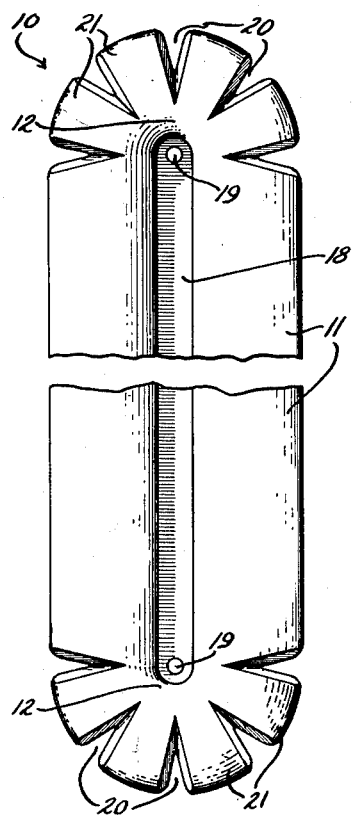
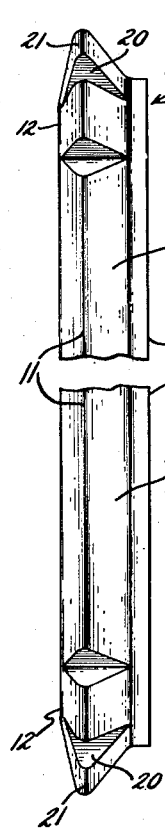
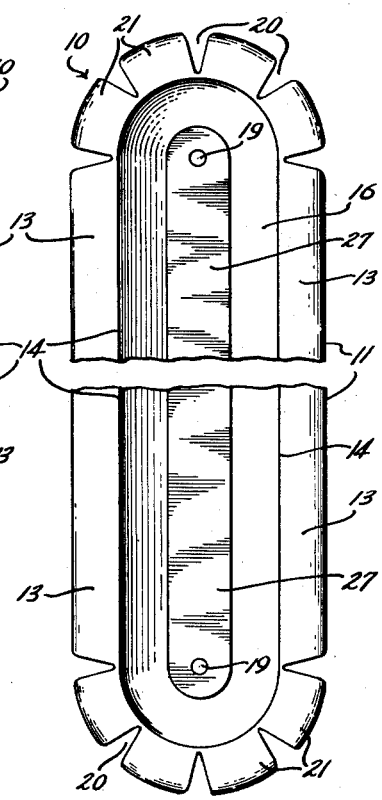
Inventor
ROBERT MAXWELL JAMES
The Firm of Charles W. Hills
by     Attys.

May 6, 1952 R. M. JAMES 2,596,028
FLEXIBLE INSERT FOR FORMING RECESSES
IN WALLS AND THE LIKE
Filed March 29, 1949 2 SHEETS—SHEET 2
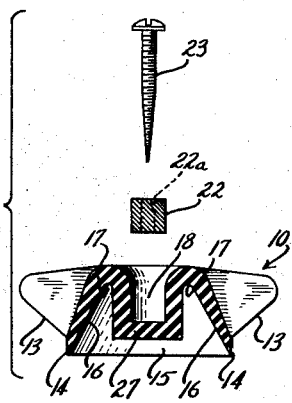
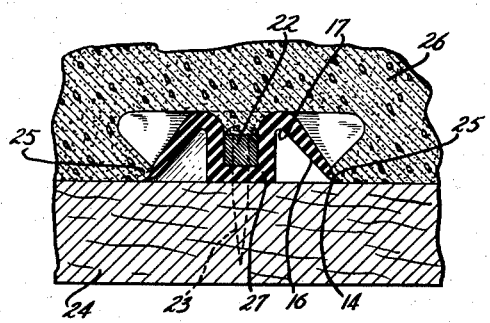
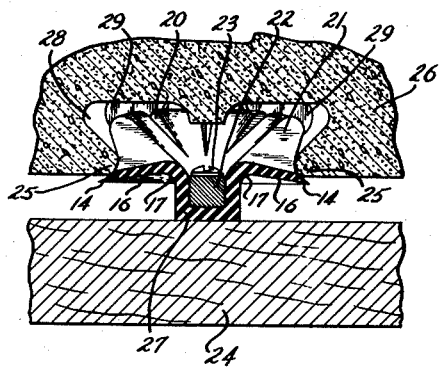
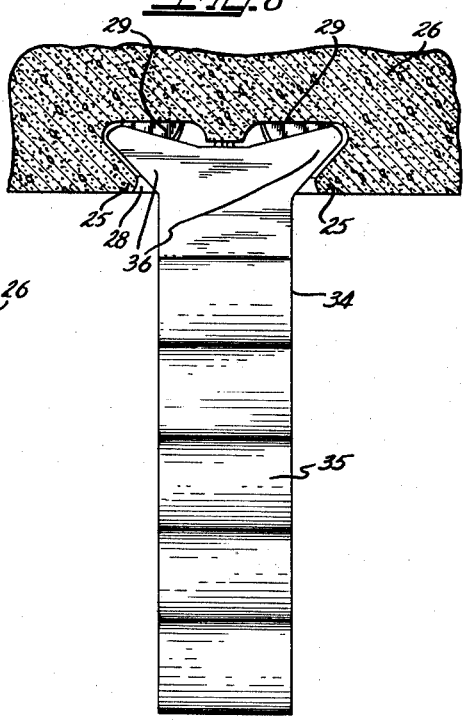
Inventor
ROBERT MAXWELL JAMES
by The Firm of Charles W. Hills
Attys.

Patented May 6, 1952

2,596,028

UNITED STATES PATENT OFFICE 2,596,028

FLEXIBLE INSERT FOR FORMING RECESSES IN WALLS AND THE LIKE

Robert Maxwell James, Buffalo, N. Y.

Application March 29, 1949, Serial No. 84,064

10 Claims. (Cl. 25—118)

This invention relates to a flexible tool device suitable for use in construction work in connection with the formation of undercut dovetail slots in vertical walls or other structural forms. More particularly, this invention relates to a flexible key form suitable for use on a mold lining intended to provide undercut slots in vertical walls suitable for anchoring masonry units and the like.

The instant invention contemplates the provision of a key form defining an elongate body made of hard oil-resistant rubber such as neoprene or the like. The elongate body is provided with arcuate end portions each having a plurality of radially spaced tongues and grooves formed in the upper face thereof. The general configuration of the elongate body is such as to define a skived edge along its complete periphery which terminates in a lip disposed on the bottom face of the key form. The bottom face of the form is recessed and extends angularly upward into the body of the form terminating in a sharp radius hinge area surrounding a downwardly depending integral channel-like hub portion. The channel-like hub portion normally terminates short of the plane developed by the lip and is preferably constructed to define a slot in the upper face thereof for receiving reinforcing and fastening means therein.

The reinforcement may take the form of a small steel bar defining suitable apertures therethrough for passing conventional fastening means such as screws or plaster-board nails and the like.

In use, the key forms provided by the present invention may be arranged on the liner surface of a typical rigid mold form in staggered array, for example, along parallel vertical axes. Thus, a plastic aggregate may be introduced into the mold form in molded proximity to the key forms to form a plurality of staggered parallel vertical undercuts or dovetail niches in the aggregate.

Niches thus formed may be advantageously employed to receive metal anchors which may be successively locked in the undercuts between progressive layers of masonry thereby securely anchoring the masonry to the concrete wall to form an integrated wall structure.

It is an object of this invention to provide a key form having the characteristics aforementioned which may be carried upon the liner surface of rigid mold form and simultaneously withdrawn from a hardened concrete conglomerate upon the stripping of the rigid mold form away from the conglomerate.

Another object of my invention is to provide a flexible tool device for forming undercut slots in vertical walls suitable for anchoring masonry units.

A further object of my invention is to provide new and useful mold forms characterized by the provision of a plurality of flexible key forming tool devices arranged in staggered array in a predetermined pattern.

Still another object of the present invention is to provide a method of producing an integrated wall structure including a concrete backing with masonry firmly anchored thereto.

It is believed that the methods practiced in connection with the present invention will be most clearly understood through a description of the apparatus provided for practicing same.

Many other objects and advantages of the present invention will become manifest to those versed in the art upon making reference to the following detailed description and accompanying drawings in which Figure 1 is a fragmentary isometric view showing the production of an integrated wall structure having a concrete backing and masonry work firmly anchored thereto in accordance with teachings of the present invention;

Figure 2 is a fragmentary plan view partly broken away of a flexible tool device embodying the principles of my invention;

Figure 3 is a fragmentary side elevational view of the device shown in Figure 2;

Figure 4 is a fragmentary bottom view of the device shown in Figures 2 and 3;

Figure 5 is an exploded view illustrating the order of assembly of a complete flexible tool device embodying the principles of my invention;

Figure 6 is a fragmentary cross-sectional view showing the structure of Figure 5 attached to the liner surface of a rigid mold form and proximately surrounded by a concrete aggregate;

Figure 7 is a fragmentary cross-sectional view demonstrating the operation of my flexible tool device during the process of withdrawing same from a hardened concrete conglomerate; and Figure 8 is a fragmentary plan view partly in section showing a metal anchor positioned in a dovetail niche formed in a concrete wall in accordance with the present invention.

As shown on the drawings:

Referring first to Figures 2, 3 and 4, a flexible key form is indicated generally by the reference numeral 10. The key form 10 is an integral structure and preferably takes the form of an elongate body formed of a hard, molded oil-resistant rubber such as neoprene or the like.

More specifically the key form 10 includes an elongated body portion 11 which is terminated on each end by an arcuate portion 12.

As may be most clearly seen on Figure 3, the upper face of the form 10 normally defines a slightly convex surface which inclines outwardly and downwardly to the outermost periphery of the key form 10.

Each key form 10 is so formed as to define an essentially skived peripheral edge 13 which inclines downwardly and inwardly from the outermost peripheral portion and terminates in a lip 14 disposed on the bottom face of the form 10.

Referring particularly to Figures 4 and 5, it will be noted that the bottom face of the key form 10 defines a recess 15 surrounded by the lip 14 and having an angularly inclined wall portion 16. The angularly inclined wall portion 16 terminates in a sharp radius 17 (Fig. 5) which forms an effective hinge area for the walls and the lip 14.

A channel-like hub portion 17 depends into the recess 15 and terminates short of the plane developed by the lower edge of the lip 14.

The upper face of the key form 10 is provided with a deep longitudinal recess 18 (Figs. 2 and 5) in the region of the hub 17, the purpose of which will be made evident presently.

One or more apertures 19 may be provided in the bottom of the recess 18 extending through the hub portion 17.

Referring further to Figures 2, 3 and 4, it will be noted that the arcuate portions 12 are provided with a plurality of radially spaced grooves 20. The grooves 20 are substantially V-shaped and have their apices aligned substantially on a common circular axis concentric with the outer periphery of the arcuate portions 12, but lying on an inner portion of the key form 10. The formation of the grooves 20 in this manner leaves the arcuate portions 12 in the form of a plurality of tongue portions 21 which are likewise radially spaced with respect to one another.

Referring now to Figures 5 and 6, a key form 10 is shown in connection with its relation to the method by which it may be connected a rigid mold form. A small steel bar 22 having suitable apertures 22a formed therein for cooperative registry with the apertures 19 may be seated in the recess 18 and a fastener 23, such as a screw or nail may be passed through each of the corresponding apertures 22a and 19 through the bottom of the key form.

When the key form 10 is initially positioned upon the liner surface of a rigid mold form 24, the lip 14 will effectively contact the liner surface in a tight sealing relationship. As the hub portion 17 is progressively pushed down, the lip 14 will tend to spread thereby increasing the tightness of the point of juncture with the mold form 24. The lip 14 will also tend to be slightly deformed as may be seen in Figure 6 in such a manner as to provide a curved lip 25 in the concrete aggregate 26 at the locale in the region of the lip 14. This is highly desirable inasmuch as crumbling and fracture of a sharp lip is thus precluded.

When the fasteners 23 are firmly seated against the steel bar 22 and securely imbedded in the liner surface of the mold form 24, the key form 10 will have its hub portion 17 lie on a co-planar level with distended lip 14 along the liner surface of the mold form 24. The upper face of the key form will also be straightened in such a manner as to define a perfectly flat plane as may be seen in Figure 6.

Because of these characteristics, the air normally trapped within the recess 15 when the key form 10 is initially placed in contact with the liner surface of a mold form 24 is expelled thereby producing a suction effect upon the liner surface when the key form 10 is finally secured in firm relationship to the mold form. This not only enhances the adherence characteristics between the key form and the liner surface but results in a favorable sealing effect which precludes the entrance of concrete leakage into the recess 15 during the pouring process.

It will also be apparent that a plurality of key forms 10 positioned upon a liner surface of a mold form 24 will define a uniform planar area which is spaced a predetermined distance from the liner surface in such a manner as to present an ideal supporting surface for bearing engagement with metal reinforcements which are frequently imbedded in concrete structures in the production of so-called ferro-concrete forms. After the plastic concrete aggregate 26 has hardened, the rigid mold form 24 may be stripped therefrom. The characteristics of the key form 10 are such that the key forms, too, are simultaneously withdrawn from the concrete during the stripping process.

As may be seen on Figure 7, the inclined wall portions 16, as well as the lip 14, pivotally hinge about the sharp radius 17 forming a hinge area and the key form 10 will therefore be contracted inwardly. In addition, as the key forms 10 are withdrawn, the V-shaped grooves 20 in the arcuate portion 12 will permit an especially effective radial contraction of the tongues 21 during the removal process.

When each key form 10 has been completely removed from the concrete 26, the concrete surface will be characterized by an undercut dovetailed slot or niche 28 corresponding to the configuration defined by the key form 10. Thus, a plurality of radially spaced fins 29 corresponding to the area defined by the radially spaced grooves 20 will be located in each end of the slot or niche 28. The provision of the radially spaced fins 29 greatly enhances the strength characteristics of the dovetail niche 28 inasmuch as the fins support the lip 25 and serve as a strong reinforcing means therefor.

It will be apparent that the key forms 10 may be selectively positioned upon the liner surface of a typical rigid mold form in any kind of spaced array in such a manner as to define a predetermined casting pattern. A particularly useful type of arrangement is shown by way of illustrative example in Figure 1 wherein is shown the production of an integrated wall structure including a concrete wall backing 31 having suitable masonry work 32 positioned adjacent thereto.

As shown on the drawings, the concrete wall 31 is assumed to have been constructed with a mold form having a plurality of key forms 10 arranged on the liner surface of said form in staggered array along parallel vertical axes thereby producing a corresponding plurality of dovetailed vertical slots 33.

It will be evident that a metal anchor 34 having a corrugated arm portion 35 and flanged end portion 36 may be quickly inserted into a slot formed by a key form 10 by placing the flanged portion 36 in engaged registry within the slot as shown on Figure 8. Thus, as successive layers of masonry work 32 are laid adjacent the concrete wall 31, the metal anchors 34 may be successively locked into the vertical slots 33 and positioned between the layers of masonry.

It will be apparent that if the masonry is laid in brick form with the use of mortar, the metal anchors 34 will not only be imbedded in the mortar but may be sealed within the vertical slots 33 by the mortar.

Although I have chosen to illustrate a method of use by specifically referring to the production of an integrated wall structure having a masonry

I claim as my invention:

1. As an article of manufacture, a key form defining an elongate body terminating in arcuate end portions, said key form defining a skived edge along its complete periphery terminating in a distortable lip disposed on the bottom face thereof, a bottom face in said form recessed interiorly of said lip and having a channel-like hub depending thereinto.

2. As an article of manufacture, a key form defining an elongate body terminating in arcuate end portions, said key form defining a skived edge along its complete periphery terminating in a flexible lip disposed on the bottom face thereof, and a bottom face in said form defining a recess interiorly of said lip and having a channel-like hub depending thereinto, said hub terminating short of the plane developed by said lip.

3. In an undercut forming device, a resiliently flexible elongate body defining an upper face, a lower face and a skived edge along its complete periphery, said skived edge terminating in a lip disposed on the lower face of said body, said lower face defining a recess having a channel-like hub depending thereinto, said lower face further characterized by a sharply turned radius between said hub and said lip forming a hinge area, said lip being flexibly and pivotally displaceable at said hinge area relative to said hub.

4. A resiliently flexible insert for forming an undercut slot in plastic material as it is set therearound, said insert comprising an elongate body defining a skived edge terminating in a lower distortable peripheral lip surrounding a recess formed in the lower face thereof, said lip defining a reentrant angle into the lower face of said body terminating in a sharply defined radius hinge area surrounding a centrally disposed hub portion depending generally into said recess of said lower face, said hub normally terminating short of the plane developed by said lip.

5. As an article of manufacture, a key form defining an elongate body terminating in arcuate end portions and having a plurality of radially spaced tongues and grooves formed in the upper face of said end portions, said form defining a skived edge along its complete periphery terminating in a flexible lip disposed on the bottom face thereof, a bottom face in said form defining a recess interiorly of said lip and having a channel-like hub depending thereinto, said hub terminating short of the plane developed by said lip, said hub having a slot formed in the upper face thereof for receiving reinforcing fastening means therein.

6. In combination, a flexible tool device for forming undercut anchorage dovetails in concrete forms or the like, comprising a key form made of flexible material defining an elongate body terminating arcuate end portions, said key form defining a skived edge along its complete periphery terminating in an elastic lip disposed on the bottom face thereof, and a bottom face on said form defining a recess interiorly of said lip and having a channel-like hub depending thereinto, a metal bar in said hub, and a plurality of fastening means passing through said bar and said key form.

7. In combination, a flexible tool device for forming undercut anchorage dovetails in concrete forms or the like comprising, a key form made of flexible material defining an elongate body terminating in arcuate end portions and having a plurality of radially spaced tongues and grooves formed in the upper face of said end portions, said key form defining a skived edge along its complete periphery terminating in a resilient lip disposed on the bottom face thereof, and a bottom face in said form defining a recess interiorly of said lip having a channel-like hub depending thereinto, said hub terminating short of the plane developed by said lip, and fastening means passing through said hub.

8. In combination, a flexible tool device for forming undercut anchorage dovetails in concrete forms or the like comprising, a key form made of flexible material defining an elongate body terminating in arcuate end portions having a plurality of radially spaced tongues and grooves formed in the upper face of said end portions, said key form defining a skived edge along its complete periphery terminating in a deformable lip disposed on the bottom face thereof, a bottom face in said key form defining a recess interiorly of said lip and having a channel-like hub depending thereinto, said hub terminating short of the plane developed by said lip, said hub having a slot formed in the upper face thereof for receiving reinforcing fastening means therein, a metal bar in said slot and a plurality of fastening means passing through said bar and said key form.

9. A key form defining a skived edge along its complete periphery terminating in an extendable lip disposed on the bottom face thereof, a bottom face on said form recessed interiorly of said lip and having a hub depending thereinto, said hub terminating short of the plane developed by said lip, said hub having a slot formed in the upper face thereof for receiving reinforcing fastening means adapted to engage a rigid mold form.

10. A key form having a plurality of radially spaced tongues and grooves formed in the upper face thereof, said key form defining a skived edge along its complete periphery terminating in a distendable lip disposed on the bottom face thereof, and a bottom face on said key form defining a recess having a hub depending thereinto, said hub terminating short of the plane developed by said lip, said hub having a recess formed in the upper face thereof for receiving reinforcing fastening means therein, and a fastening means passing through said key form adapted to engage a rigid mold form.

ROBERT MAXWELL JAMES.

REFERENCES CITED

The following references are of record in the file of this patent:

UNITED STATES PATENTS

| Number | Name | Date |
|---|---|---|
| 259,863 | Jewell | June 20, 1882 |
| 1,470,835 | Hathaway | Oct. 16, 1923 |
| 1,603,917 | Johnston | Oct. 19, 1926 |
| 1,641,147 | Barton | Sept. 6, 1927 |
| 2,319,727 | Duggan | May 18, 1943 |
| 2,496,616 | Barton | Feb. 7, 1950 |
| 2,533,131 | Mathis | Dec. 5, 1950 |